United States Patent
Yandrasits et al.

(10) Patent No.: US 6,979,383 B2
(45) Date of Patent: Dec. 27, 2005

(54) ONE-STEP METHOD OF BONDING AND SEALING A FUEL CELL MEMBRANE ELECTRODE ASSEMBLY

(75) Inventors: Michael Andrew Yandrasits, Hastings, MN (US); David Adrian Ylitalo, Stillwater, MN (US); Douglas Willard Kado, Menomonie, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/322,225

(22) Filed: Dec. 17, 2002

(65) Prior Publication Data

US 2004/0112532 A1    Jun. 17, 2004

(51) Int. Cl.⁷ ................................. C09J 5/02
(52) U.S. Cl. .................. 156/307.3; 429/35; 429/36
(58) Field of Search ............ 156/307.3, 307.7, 156/324.4, 308.4; 429/34, 35, 36, 30, 38

(56) References Cited

U.S. PATENT DOCUMENTS

| | | | | |
|---|---|---|---|---|
| 4,397,917 A | * | 8/1983 | Chi et al. | ...................... 429/26 |
| 5,264,299 A | | 11/1993 | Krasij et al. | |
| 5,464,700 A | | 11/1995 | Steck et al. | |
| 6,057,054 A | | 5/2000 | Barton et al. | |
| 6,080,503 A | * | 6/2000 | Schmid et al. | ................. 429/35 |
| 6,159,628 A | | 12/2000 | Grasso et al. | |
| 6,165,634 A | | 12/2000 | Krasij et al. | |
| 6,808,838 B1 | * | 10/2004 | Wilson | ......................... 429/34 |
| 2001/0001052 A1 | | 5/2001 | Bonk et al. | |
| 2003/0211378 A1 | * | 11/2003 | Wald et al. | .................... 429/35 |
| 2004/0096725 A1 | * | 5/2004 | Mao et al. | ..................... 429/38 |

FOREIGN PATENT DOCUMENTS

| | | |
|---|---|---|
| WO | WO 97/23916 A2 | 7/1997 |
| WO | WO 02/25753 A1 | 3/2002 |
| WO | WO 02/093669 | 11/2002 |

* cited by examiner

Primary Examiner—Jeff H. Aftergut
Assistant Examiner—John L. Goff
(74) Attorney, Agent, or Firm—Philip Y. Dahl

(57) ABSTRACT

A method is provided for making an edge-sealed fuel cell membrane electrode assembly comprising the steps of: i) providing a suitable membrane electrode assembly lay-up; ii) positioning a suitable annular layer of a thermoplastic; and iii) applying pressure and heat sufficient to melt impregnate the thermoplastic into the fluid transport layer or layers of the membrane electrode assembly lay-up and simultaneously bond the fluid transport layer or layers to the polymer electrolyte membrane of the membrane electrode assembly lay-up. The polymer electrolyte membrane of the membrane electrode assembly lay-up may be perforated in its outer sealing area. Membrane electrode assemblies made according to the method of the present invention are also provided.

1 Claim, 3 Drawing Sheets

ONE-STEP METHOD OF BONDING AND SEALING A FUEL CELL MEMBRANE ELECTRODE ASSEMBLY

FIELD OF THE INVENTION

This invention relates to a method for making a membrane electrode assembly (MEA) for use in a fuel cell wherein fluid transport layers (FTL's) are edge-sealed and bound to a polymer electrolyte membrane (PEM) in a single step.

BACKGROUND OF THE INVENTION

U.S. Pat. No. 6,165,634 discloses fuel cell stack wherein peripheral areas of the fuel cell components are impregnated and/or bound together by a seal material, preferably a fluoroelastomer, which covers the outer edges of the cell components.

U.S. Pat. No. 6,159,628 and U.S. 2001/0,001,052 disclose an MEA having an edge-sealed substrate preferably formed by extruding a thermoplastic polymer, such as polyvinylidine fluoride, into the periphery of the substrate. The edge-sealed substrate is bound to the proton exchange membrane by a thermoplastic material, preferably a polyolefin film.

U.S. Pat. No. 6,057,054 discloses, in some embodiments, an MEA having co-extensive polymer electrolyte membrane and porous electrode layers having a seal material such as silicone impregnated into the porous electrode layers. The reference discloses, in other embodiments, an MEA having a seal material impregnated into the porous electrode layers thereof, where the seal extends beyond the MEA. The seal may include a pattern of raised ribs and cross-ribs.

U.S. Pat. No. 5,264,299 discloses a porous support plate for use in a fuel cell which has a peripheral portion filled with elastomeric sealing material.

SUMMARY OF THE INVENTION

Briefly, the present invention provides a method of making an edge-sealed fuel cell membrane electrode assembly comprising the steps of: i) providing a suitable membrane electrode assembly lay-up; ii) positioning a suitable annular layer of a thermoplastic; and iii) applying pressure and heat sufficient to melt impregnate the thermoplastic into the fluid transport layer or layers of the membrane electrode assembly lay-up and bond the fluid transport layer or layers to the polymer electrolyte membrane of the membrane electrode assembly lay-up. In one embodiment, the polymer electrolyte membrane of the membrane electrode assembly lay-up is perforated in its outer sealing area.

In another aspect, the present invention provides a membrane electrode assembly made according to the method of the present invention.

In this application:

"non-coincident" means, with regard to the perimeters of two or more overlapping, essentially planar shapes, that the perimeters do not coincide for any significant length, but that the perimeters may cross, as can be seen, e.g., for the three fuel cell layers depicted in FIG. 6.

It is an advantage of the present invention to provide a method of bonding and sealing a fuel cell membrane electrode assembly in the same step.

DETAILED DESCRIPTION OF PREFERRED EMBODIMENTS

Figure 1:
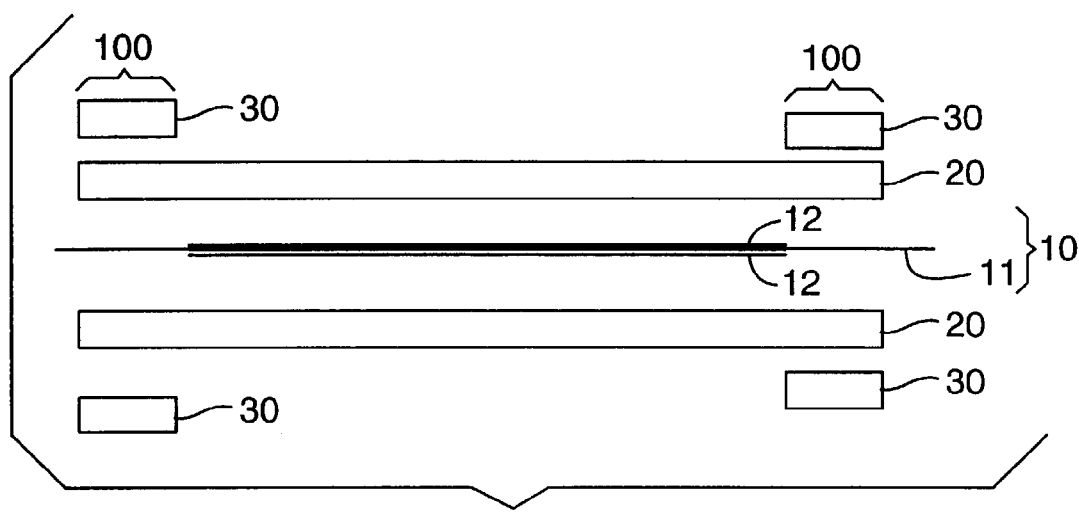
FIG. 1 is a schematic cross section of an MEA lay-up for use in the method according to the present invention.

In general, the present invention provides a method of making an edge-sealed fuel cell membrane electrode assembly comprising the steps of: i) providing a suitable membrane electrode assembly lay-up; ii) positioning a suitable annular layer of a thermoplastic; and iii) applying pressure and heat sufficient to melt impregnate the thermoplastic into the fluid transport layer or layers of the membrane electrode assembly lay-up and simultaneously bond the fluid transport layer or layers to the polymer electrolyte membrane of the membrane electrode assembly lay-up.

A membrane electrode assembly (MEA) is the central element of proton exchange membrane fuel cells such as hydrogen fuel cells. Fuel cells are electrochemical cells which produce usable electricity by the catalyzed combination of a fuel such as hydrogen and an oxidant such as oxygen. Typical MEA's comprise a polymer electrolyte membrane (PEM) (also known as an ion conductive membrane (ICM)), which functions as a solid electrolyte. One face of the PEM is in contact with an anode electrode layer and the opposite face is in contact with a cathode electrode layer. Each electrode layer includes electrochemical catalysts, typically including platinum metal. Fluid transport layers (FTL's) facilitate gas transport to and from the anode and cathode electrode materials and conduct electrical current. In a typical PEM fuel cell, protons are formed at the anode via hydrogen oxidation and transported to the cathode to react with oxygen, allowing electrical current to flow in an external circuit connecting the electrodes. The FTL may also be called a gas diffusion layer (GDL) or a diffuser/current collector (DCC). The anode and cathode electrode layers may be applied to the PEM or to the FTL during manufacture, so long as they are disposed between PEM and FTL in the completed MEA. In the practice of the present invention, the electrode layers are most typically applied to the PEM to form a catalyst coated membrane (CCM).

Any suitable PEM may be used in the practice of the present invention. The PEM typically has a thickness of less than 50 microns, more typically less than 40 microns, more typically less than 30 microns, and most typically about 25 microns. The PEM is typically comprised of a polymer electrolyte that is an acid-functional fluoropolymer, such as Nafion® (DuPont Chemicals, Wilmington Del.) and Flemion™ (Asahi Glass Co. Ltd., Tokyo, Japan). The polymer electrolytes useful in the present invention are typically copolymers of tetrafluoroethylene and one or more fluorinated, acid-functional comonomers. Typically the polymer electrolyte bears sulfonate functional groups. Most typically the polymer electrolyte is Nafion®. The polymer electrolyte typically has an acid equivalent weight of 1200 or less, more typically 1100 or less, more typically 1050 or less, and most typically about 1000.

Any suitable FTL may be used in the practice of the present invention. Typically the FTL is comprised of sheet material comprising carbon fibers. Typically the FTL is a carbon fiber construction selected from woven and non-woven carbon fiber constructions. Carbon fiber constructions which may be useful in the practice of the present invention may include: Toray™ Carbon Paper, Spectra-Carb™ Carbon Paper, AFN™ non-woven carbon cloth, Zoltek™ Carbon Cloth, and the like. The FTL may be coated or impregnated with various materials, including carbon particle coatings, hydrophilizing treatments, and hydrophobizing treatments such as coating with polytetrafluoroethylene (PTFE).

Any suitable catalyst may be used in the practice of the present invention. Typically, carbon-supported catalyst particles are used. Typical carbon-supported catalyst particles are 50–90% carbon and 10–50% catalyst metal by weight, the catalyst metal typically comprising Pt for the cathode and Pt and Ru in a weight ratio of 2:1 for the anode. Typically, the catalyst is applied to the PEM or to the FTL in the form of a catalyst ink. Alternately, the catalyst ink may be applied to a transfer substrate, dried, and thereafter applied to the PEM or to the FTL as a decal. The catalyst ink typically comprises polymer electrolyte material, which may or may not be the same polymer electrolyte material which comprises the PEM. The polymer electrolyte is typically an acid-functional fluoropolymer, such as Nafion® (DuPont Chemicals, Wilmington Del.) and Flemion™ (Asahi Glass Co. Ltd., Tokyo, Japan). The polymer electrolytes useful in inks for use in the present invention are typically copolymers of tetrafluoroethylene and one or more fluorinated, acid-functional comonomers. Typically the polymer electrolyte bears sulfonate functional groups. Most typically the polymer electrolyte is Nafion®. The polymer electrolyte typically has an equivalent weight of 1200 or less, more typically 1100 or less, more typically 1050 or less, and most typically about 1000. The catalyst ink typically comprises a dispersion of catalyst particles in a dispersion of the polymer electrolyte. The ink typically contains 5–30% solids (i.e. polymer and catalyst) and more typically 10–20% solids. The electrolyte dispersion is typically an aqueous dispersion, which may additionally contain alcohols and polyalcohols such a glycerin and ethylene glycol. The water, alcohol, and polyalcohol content may be adjusted to alter Theological properties of the ink. The ink typically contains 0–50% alcohol and 0–20% polyalcohol. In addition, the ink may contain 0–2% of a suitable dispersant. The ink is typically made by stirring with heat followed by dilution to a coatable consistency.

The catalyst may be applied to the PEM to form a CCM by any suitable means, including both hand and machine methods, including hand brushing, notch bar coating, fluid bearing die coating, wire-wound rod coating, fluid bearing coating, slot-fed knife coating, three-roll coating, or decal transfer. Coating may be achieved in one application or in multiple applications.

In use, the MEA according to the present typically sandwiched between two rigid plates, known as distribution plates, also known as bipolar plates (BPP's) or monopolar plates. Like the GDL, the distribution plate must be electrically conductive. The distribution plate is typically made of a carbon composite, metal, or plated metal material. The distribution plate distributes reactant or product fluids to and from the MEA electrode surfaces, typically through one or more fluid-conducting channels engraved, milled, molded or stamped in the surface(s) facing the MEA(s). These channels are sometimes designated a flow field. The distribution plate may distribute fluids to and from two consecutive MEA's in a stack, with one face directing fuel to the anode of the first MEA while the other face directs oxidant to the cathode of the next MEA (and removes product water), hence the term "bipolar plate." Alternately, the distribution plate may have channels on one side only, to distribute fluids to or from an MEA on only that side, which may be termed a "monopolar plate." The term bipolar plate, as used in the art, typically encompasses monopolar plates as well. A typical fuel cell stack comprises a number of MEA's stacked alternately with bipolar plates. The MEA according to the present invention is typically not bound to any BPP or distribution plate. In particular, the MEA according to the present invention is typically not bound to any BPP or distribution plate by the thermoplastic that bonds together the FTL and PEM of the MEA.

Figure 2:
FIG. 2 is a schematic cross section of an MEA lay-up for use in the method according to the present invention.

In the method according to the present invention, a membrane electrode assembly lay-up is first provided. With reference to FIGS. 1 and 2, the central layer of the lay-up is CCM 10, which includes a PEM 11 coated on both the anode and cathode sides with layers of catalyst material 12. On at least one of the anode and cathode sides of the CCM 10 an FTL 20 is provided. In some embodiments, such as depicted in FIG. 1, an FTL 20 is provided on both sides. In some embodiments, such as depicted in FIG. 2, an FTL 20 is provided on one side only and an edge-sealed FTL 25 is provided on the other side. An edge-sealed FTL 25 is made by filling the outer perimeter or sealing area of the FTL with any suitable material, including the thermoplastics useful in the practice of the present invention (see below). The outer perimeter of the FTL may be filled by any suitable method, including application of pressure and heat sufficient to melt impregnate the thermoplastic into the FTL. No additional adhesive is added to the MEA lay-up.

Figure 5:
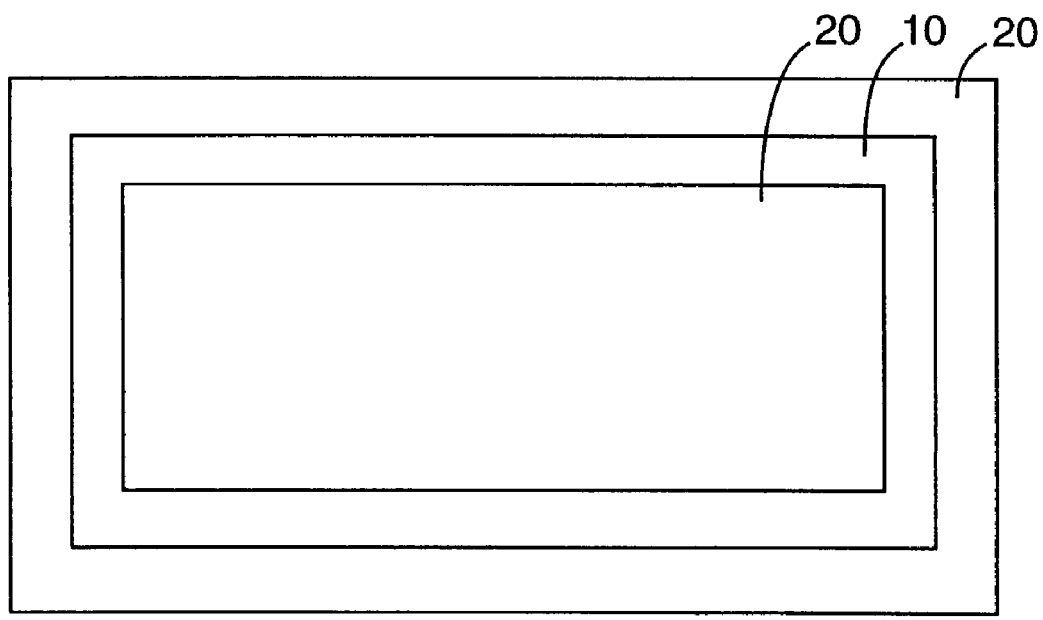
FIG. 5 is a schematic depiction of an MEA lay-up for use in the method according to the present invention.
Figure 6:
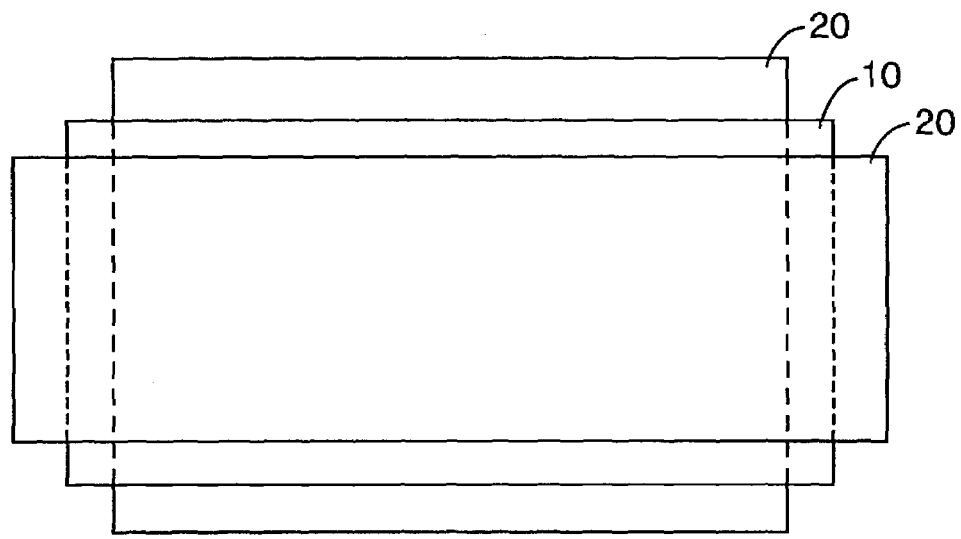
FIG. 6 is a schematic depiction of an MEA lay-up for use in the method according to the present invention.

The MEA, CCM, PEM and FTL's may have any suitable perimeter shape. The dimensions of the PEM and the FTL's are typically chosen so as to minimize the possibility of an electrical short circuit between the two FTL's. The outer perimeter of the FTL is non-coincident with the outer perimeter of the PEM which comprises the CCM. Typically, the geometry of the PEM and FTL's is chosen so that the two FTL's cannot make contact during the bonding process. In that case, non-edge-sealed FTL's are typically used on both sides. As depicted in FIG. 1, the PEM 11 is typically larger than the FTL 20. In another embodiment, depicted in FIG. 5, the CCM 10 is larger than one FTL 20 and smaller than the other. In a further embodiment, depicted in FIG. 6, the CCM 10 is larger than one FTL 20 on only one axis (designated North-South) and larger than the other only on another axis (designated East-West). If two FTL's can make contact during the bonding process, as in the lay-up depicted in FIG. 2 where the CCM 10 is smaller than the FTL's 20, an edge-sealed FTL 25 may be used on one side.

In an alternate embodiment, the CCM is smaller than both FTL's and an additional, annular scrim layer circles the perimeter of the CCM, maintaining a separation between the FTL's. In this case, the thermoplastic serves to bond together CCM, FTL and scrim layers. The scrim layer is porous and electrically non-conductive. The scrim layer can be made of any suitable material, typically one that is inert to conditions of manufacture and use.

In the method according to the present invention, a thermoplastic 30 is then positioned relative to the MEA lay-up. The thermoplastic 30 is provided as a layer cut in an annular or picture-frame shape, typically coinciding with a sealing area 100 or outer perimeter zone of the MEA. The thermoplastic 30 is positioned adjacent to one or both of the FTL's 20. Typically, the annular layer of thermoplastic 30 is placed on the face of the FTL 20 not contacting the CCM 10, that is, to the exterior of the MEA lay-up, as depicted in FIGS. 1 and 2. Alternately, the annular layer of thermoplastic 30 may be placed between the FTL 20 and the CCM 10.

Any suitable thermoplastic may be used. Typically the thermoplastic is selected from thermoplastics having either a melting point or a glass transition temperature that is not more than 70° C. greater than the heat distortion temperature of the polymer electrolyte membrane, more typically not more than 50° C. greater, and most typically not more than 30° C. greater. The heat distortion temperature is typically the glass transition temperature for most PEM's, including Nafion®. Typical thermoplastics include terpolymers of tetrafluoroethylene, hexafluoropropylene and vinylidene fluoride (THV), copolymers of hexafluoropropylene and vinylidene fluoride, and polyvinylidine fluoride (PVDF). Most typically, the thermoplastic is THV.

Figure 3:
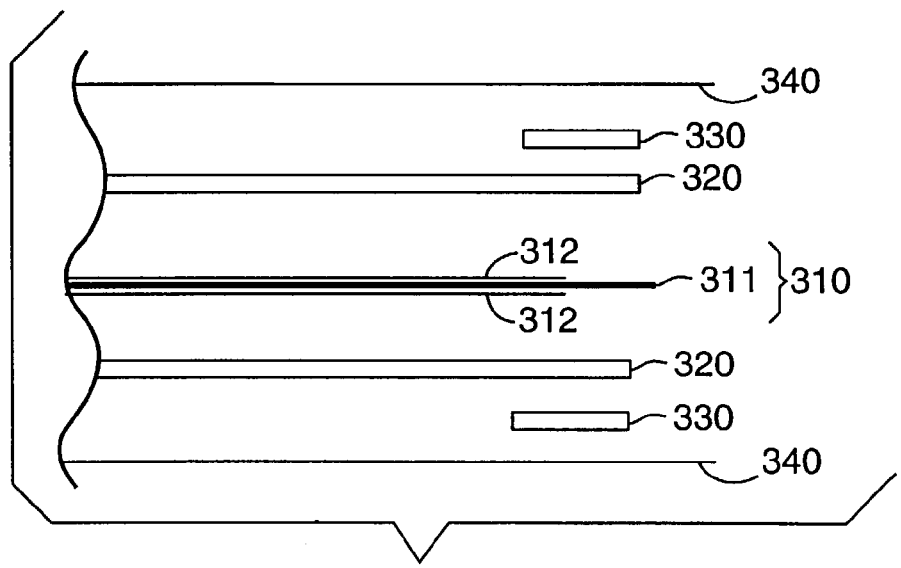
FIG. 3 is a schematic cross section of representative edge portion of the lay-up for Example 1.
Figure 4:
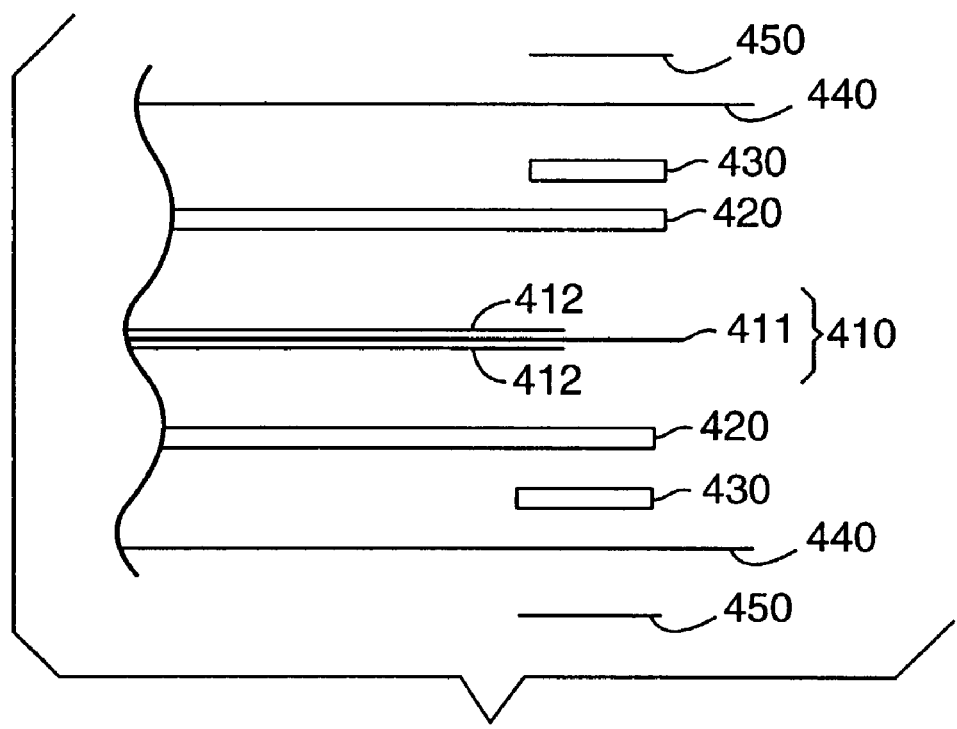
FIG. 4 is a schematic cross section of representative edge portion of the lay-up for Example 2.

With reference to FIGS. 3 and 4, a release layer 340, 440 may also be applied to either or both sides of the lay-up. In addition, shim layers 450 may also be applied. The release and shim layers may be made of any suitable material. The shim layer 450 is typically cut in an annular or picture-frame shape, typically coinciding with a sealing area or outer perimeter zone of the MEA. More typically, the shim has substantially the same shape as the annular layer of a thermoplastic.

After the MEA lay-up is assembled together with the appropriate thermoplastic and release or shim layers, pressure and heat are applied, sufficient to melt impregnate the thermoplastic into the fluid transport layer or layers and simultaneously bond the fluid transport layer or layers to the polymer electrolyte membrane. Pressure and heat may be applied by any suitable means, including platen press, nip roller, or the like. The pressure and heat applied is sufficient to bond the FTL to the PEM through the thermoplastic but not so much as to distort the PEM. Typically, a pressure at least 1.0 MPa at a temperature of at least 100° C. is applied. In order to reduce crushing damage to the FTL, the bonding step may be phased in two periods. Typically, the first period is performed at a pressure of between 0.4 MPa and 1.0 MPa at a temperature of at least 100° C. for a duration of at least 1 minute and the second is performed at a pressure of at least 1.0 MPa at a temperature of at least 100° C. for a duration of at least 1 minute.

Figure 7:
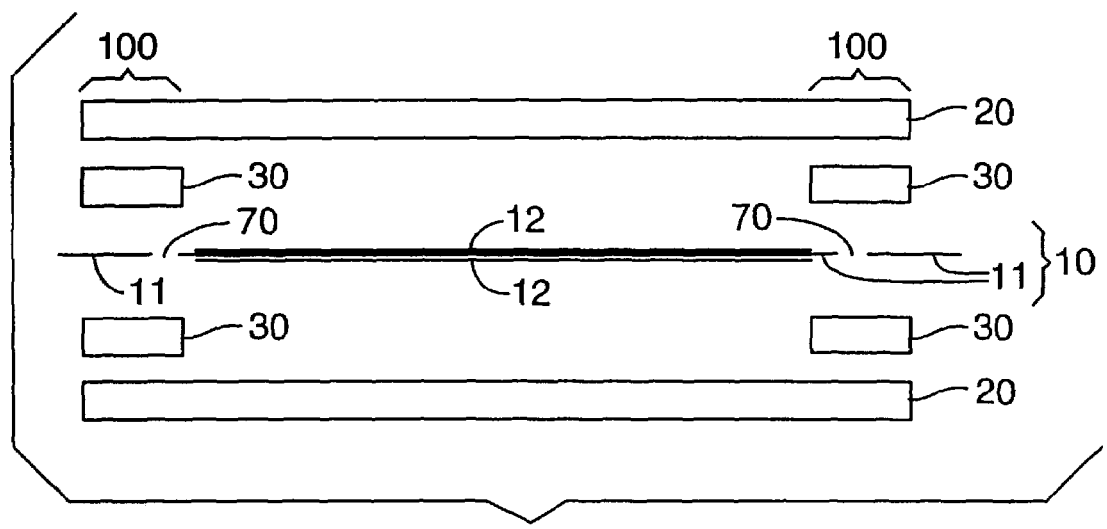
FIG. 7 is a schematic cross section of an MEA lay-up for use in the method according to the present invention.

With reference to FIG. 7, in one embodiment of the method according to the present invention the CCM 10 has perforations 70 in its outer seal area 100. The perforations 70 typically pass through the PEM 11 of the CCM 10 but not through the catalyst layers 12 of the CCM 10. The thermoplastic 30 may then form a 'weld' from one FTL 20 to the other through the perforation 70 during the bonding step. Typically, in the practice of this embodiment, the thermoplastic 30 is placed between the FTL 20 and the CCM 10 before bonding. The perforations 70 may be of any suitable size and spacing but are not so large or closely spaced so as to present a risk of forming an electrical short circuit between the FTL's 20. Typically, the perforations are not more than a millimeter in average diameter and not closer, on average, than two millimeters.

This invention is useful in the manufacture of membrane electrode assemblies for use in fuel cells.

Objects and advantages of this invention are further illustrated by the following examples, but the particular materials and amounts thereof recited in these examples, as well as other conditions and details, should not be construed to unduly limit this invention.

EXAMPLES

Unless otherwise noted, all reagents were obtained or may be available from Aldrich Chemical Co., Milwaukee, Wis., or may be synthesized by known methods.

In both of Examples 1 and 2, the membrane electrode assemblies (MEA's) were rectangular in shape, 14" (35.6 cm) long by 10" (25.4 cm) wide. Each MEA had an outer sealing area occupying a margin of 1" (2.54 cm) around the perimeter of the MEA. The PEM was prepared by notch-coating a dispersion of Nafion™ 1000 (DuPont Chemical Co.) onto an inert backing at a loading such that the final, dried film was approximately 30.5 µm thick. The cast film was first passed through a drying oven at 50–60° C. (approximately 3–4 minutes dwell time), then dried at 130° C. for 4 minutes in an air-impingement oven to remove the remainder of the solvent and to anneal the Nafion™ film. The dried film was peeled from the backing for subsequent use. The catalyst coated membrane (CCM) was made by decal transfer of a catalyst ink onto both faces of the PEM. The FTL was a 7 mil (178 micron) thick Toray™ Carbon Paper manufactured by Toray Industries, Inc., Tokyo, Japan, coated with a carbon/Teflon layer on the face contacting the CCM. The THV thermoplastic was 0.006" (152 micron) thick Dyneon™ THV-220 film manufactured by Dyneon, St. Paul, Minn. The Kapton® film used as a release liner and as a shim layer was 0.002" (50.8 micron) thick Kapton® polyimide film manufactured by DuPont Chemicals, Wilmington, Del.

Two MEA's were made using the one-step seal and bond process according to the present invention. A representative edge portion of the lay-up for each of these five Examples is depicted schematically in FIGS. 3 and 4.

A representative edge portion of the MEA lay-up for Example 1 is depicted schematically in cross section in FIG. 3. An FTL 320 was placed on each side of the CCM 310. The CCM 310 included a PEM 311 coated on each side with a layer of catalyst 312. An annular (picture frame shape) layer of THV 330, occupying the outer sealing area of the MEA lay-up, was placed on the outer side of each FTL 320. A release layer of Kapton® film 340 was placed on the outer side of each layer of THV 330.

A representative edge portion of the MEA lay-up for Example 2 is depicted schematically in cross section in FIG. 4. An FTL 420 was placed on each side of the CCM 410. The CCM 410 included a PEM 411 coated on each side with a layer of catalyst 412. An annular (picture frame shape) layer of THV 430, occupying the outer sealing area of the MEA lay-up, was placed on the outer side of each FTL 420. A release layer of Kapton® film 440 was placed on the outer side of each layer of THV 430. An annular (picture frame shape) layer of Kapton® film 450, occupying the outer sealing area of the MEA lay-up, was placed on the outer side of each release layer of Kapton® film 440 to function as a shim.

In each case, the lay-up was placed between the platens of a Carver Press (Fred Carver Co., Wabash, Ind.). The bonding step was accomplished in two periods. The first hot press period was carried out at 132° C. and 0.64 MPa pressure for a duration of 2 minutes. The second hot press period was carried out at 132° C. and 1.54 MPa pressure for a duration of 15 minutes. Bonding was followed by a cold pressing or fixing step carried out at room temperature and 1.5 MPa pressure for a duration of 5 minutes. Dry resistance values were measured by placing the MEA between two metal plates, weighing approximately 10 lbs., and measuring the resistance between the plates with a common multimeter. In general, dry resistance should be above 1.0 ohm, a value of less than 1.0 ohm being considered an electrical short-circuit. Dry resistance was 48 ohms for Example 1 and 26 ohms for Example 2.

Various modifications and alterations of this invention will become apparent to those skilled in the art without departing from the scope and principles of this invention, and it should be understood that this invention is not to be unduly limited to the illustrative embodiments set forth hereinabove. All publications and patents are herein incorporated by reference to the same extent as if each individual publication or patent was specifically and individually indicated to be incorporated by reference.

We claim:

1. A method of making an edge-sealed fuel cell membrane electrode assembly comprising the steps of:
   i) providing a membrane electrode assembly lay-up comprising:
      a) a polymer electrolyte membrane having an anode face, a cathode face, and an outer perimeter;
      b) a layer of anode catalyst material in contact with at least a portion of the anode face of said polymer electrolyte membrane;
      c) a layer of cathode catalyst material in contact with at least a portion of the cathode face of said polymer electrolyte membrane;
      d) an anode-side fluid transport layer, said anode-side fluid transport layer being in contact with said layer of anode catalyst material, said anode-side fluid transport layer having an outer perimeter non-coincident with the outer perimeter of said polymer electrolyte membrane; and
      e) a cathode-side fluid transport layer, said cathode-side fluid transport layer being in contact with said layer of cathode catalyst material, said cathode-side fluid transport layer having an outer perimeter non-coincident with the outer perimeter of said polymer electrolyte membrane;
      said membrane electrode assembly comprising no adhesive between said polymer electrolyte membrane and either of said fluid transport layers;
   ii) positioning adjacent to one or both of said anode-side fluid transport layer and said cathode-side fluid transport layer an annular layer of a thermoplastic;
   iii) applying pressure and heat sufficient to melt impregnate said thermoplastic into said fluid transport layer or layers and bond said fluid transport layer or layers to said polymer electrolyte membrane;
   wherein said membrane electrode assembly lay-up additionally comprises:
      f) an annular scrim layer surrounding the outer perimeter of said polymer electrolyte membrane, wherein said annular scrim layer is porous and electrically non-conductive.

* * * * *

UNITED STATES PATENT AND TRADEMARK OFFICE
CERTIFICATE OF CORRECTION

PATENT NO. : 6,979,383 B2
APPLICATION NO. : 10/322225
DATED : December 27, 2005
INVENTOR(S) : Michael A. Yandrasits It is certified that error appears in the above-identified patent and that said Letters Patent is hereby corrected as shown below:

Column 2
Line 1: delete "DRAWING" and insert -- DRAWINGS -- therefore.

Column 3
Line 49: delete "Theological" and insert -- rheological -- therefore.

Column 7
Line 27: delete "a layer" and insert -- A layer -- therefore.
Line 30: delete "a layer" and insert -- A layer -- therefore.

Signed and Sealed this

Twenty-fourth Day of July, 2007

JON W. DUDAS
*Director of the United States Patent and Trademark Office*